United States Patent [19]
Zoppitelli et al.

[11] Patent Number: 5,813,626
[45] Date of Patent: Sep. 29, 1998

[54] SUSPENSION DEVICE FOR A TRANSMISSION BOX OF A ROTARY-WING AIRCRAFT

[75] Inventors: Elio Zoppitelli, Bouc Bel Air; Laurent Jean Daniel Girard, Marseille, both of France

[73] Assignee: Eurocopter France, Marignane, France

[21] Appl. No.: 832,105

[22] Filed: Apr. 3, 1997

[30] Foreign Application Priority Data

Apr. 3, 1996 [FR] France ................................. 96 04168

[51] Int. Cl.⁶ ........................................... B64C 27/51
[52] U.S. Cl. .................................. 244/17.27; 244/17.13
[58] Field of Search .......................... 244/17.11, 17.13, 244/17.27, 54; 188/379, 380; 416/500; 248/559, 636, 638

[56] References Cited

U.S. PATENT DOCUMENTS

| | | |
|---|---|---|
| 4,431,148 | 2/1984 | Mouille . |
| 5,190,244 | 3/1993 | Yana . |
| 5,458,222 | 10/1995 | Pla et al. . |

FOREIGN PATENT DOCUMENTS

| | | |
|---|---|---|
| 0488845 | 6/1992 | European Pat. Off. . |
| 0058117 | 8/1992 | European Pat. Off. . |
| 2474996 | 2/1980 | France . |
| 2499505 | 2/1981 | France . |
| 4024328 | 9/1991 | Germany . |
| 2087033 | 10/1980 | United Kingdom . |

*Primary Examiner*—Galen L. Barefoot
*Attorney, Agent, or Firm*—Fisher, Christen & Sabol

[57] ABSTRACT

The present invention relates to a suspension device for a transmission box (BT) of a rotary-wing aircraft, including bearing pieces (2) connected to the upper part (3) of the transmission box (BT), a suspension system (SU) which connects the lower part (9) of the transmission box (BT) to the fuselage (F) of the aircraft and which includes suspension leaves (5), and resonator means (7) which are associated respectively with the said bearing pieces (2) and which include a mass support (13) secured to the associated suspension leaf (5) and equipped with a flapping mass (MB). According to the invention, the said device additionally includes tuning means (18, 19) associated with the said resonator means (7) and capable of tuning their natural frequencies.

14 Claims, 2 Drawing Sheets

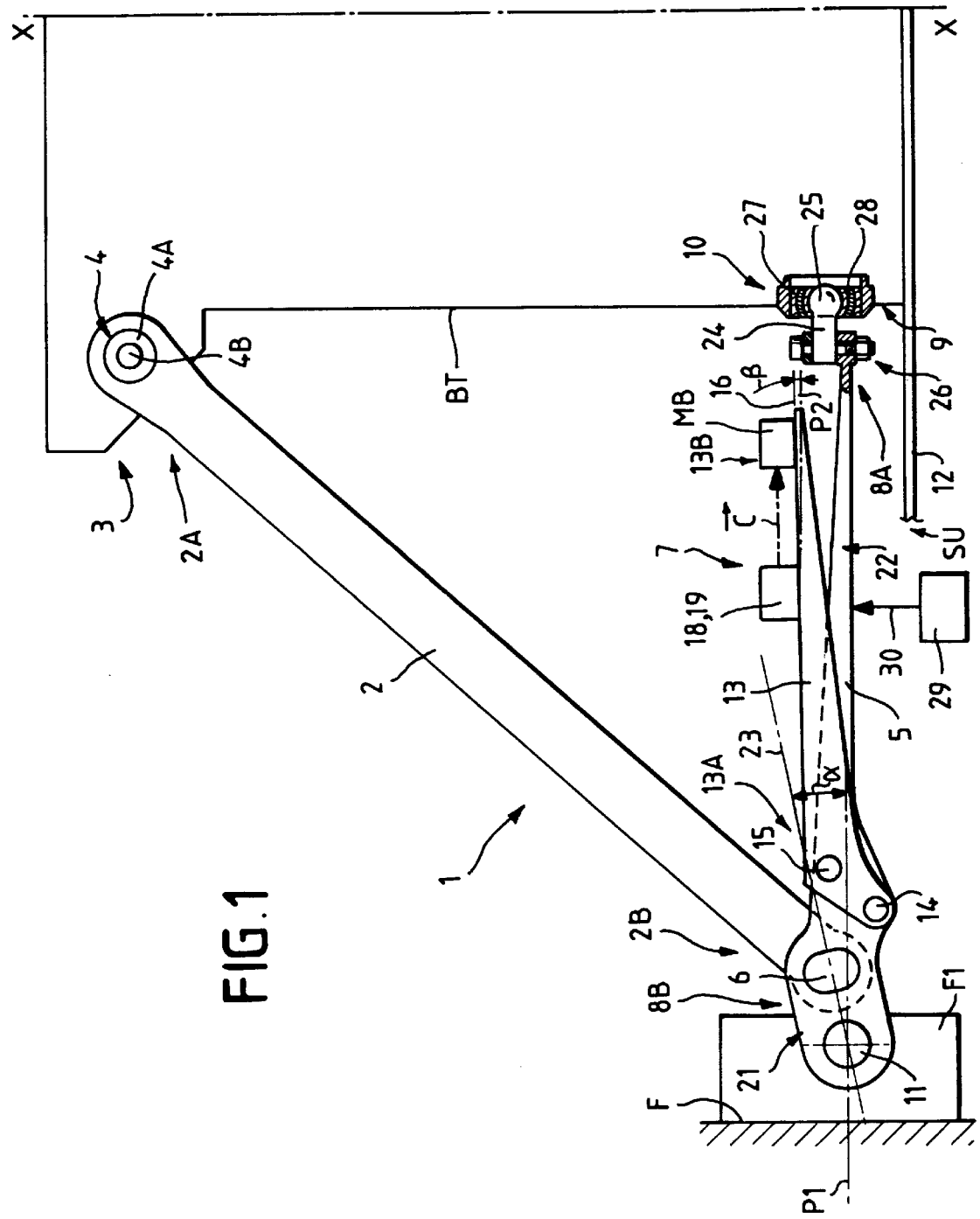

SUSPENSION DEVICE FOR A TRANSMISSION BOX OF A ROTARY-WING AIRCRAFT

BACKGROUND OF THE INVENTION

1. Field of the Invention

The present invention relates to a suspension device for a transmission box of a rotary-wing aircraft, especially a helicopter.

Although not exclusively, the present invention is more particularly applicable to the main transmission box of a helicopter, which box is mounted between propulsion means and a lift rotor of the said helicopter so that it is substantially longitudinal to the axis of the said rotor and which box is suspended with respect to the fuselage of the said helicopter.

2. Background Art

It is known that the main transmission box of a helicopter is subjected to substantial vibration generated by the said lift rotor. This vibration is particularly troublesome because in the absence of a system filtering out the vibration, such as a suspension of the transmission box, for example, this vibration is transmitted to the structure of the fuselage of the helicopter and is particularly likely to limit the top speed of the helicopter, to weaken its structural strength and to have an adverse effect on the comfort of the occupants of the helicopter. It is therefore necessary for the said suspension device to oppose as effectively as possible the transmission of such vibration and of the associated forces from the main transmission box to the fuselage of the helicopter so as to avoid premature wear on the elements subjected to this vibration and make the pilot's cabin and the passenger cabin comfortable.

French Patent Nos. 2,474,996 and 2,499,505 make known helicopter main transmission box suspension devices making it possible to reduce particularly effectively the vibration generated by the lift rotor.

Thus the suspension devices described in these prior documents are of the type including:

bearing pieces distributed radially around the said transmission box, the upper ends of which are connected to the upper part of the transmission box and the lower ends of which are articulated to suspension leaves;

a suspension system connecting the lower part of the transmission box to the fuselage of the aircraft and especially including the said suspension leaves which are distributed radially about the said transmission box in a plane substantially orthogonal to the axis of the rotor, the radially inner ends of which are fixed to the lower part of the said transmission box, and the radially outer ends of which are articulated to the fuselage; and resonator means associated respectively with the said bearing pieces, each of the said resonator means including a mass support which is secured by one of its ends to the suspension leaf connected to the associated bearing piece, which has a longitudinal direction passing through the axis of the rotor, and which is equipped at its other end with a flapping mass. The said resonator means are essentially intended to reduce the vibration of the rotor transmitted via the said bearing pieces.

In general, in order to provide a connection between the lower part of the transmission box and the fuselage, the said suspension system additionally includes a substantially flat membrane arranged beneath transmission box and projecting radially beyond the said transmission box, this membrane being fixed by its peripheral part to the fuselage of the aircraft so that it is substantially orthogonal to the axis of the rotor, it being deformable in bending when subjected to forces exerted orthogonally to its plane and rigid when subjected to forces exerted in its plane.

According to the embodiment envisaged, the said membrane and the said suspension leaves are:

either made as a single piece, as described in the French Patent No. 2,474,996 Document No. 0058117 and U.S. Pat. No. 4,431,148;

or made independently in the form of separate pieces, as described in French Patent No. 2,499,505.

The known suspension device described previously is particularly effective in reducing vibration generated by the rotor under given operating conditions.

However, the characteristics of this suspension device are fixed and set to operate optimally for predetermined flight conditions. Thus, when the actual flight conditions differ from these predetermined flight conditions for whatever reason, the effectiveness of this suspension device diminishes.

BRIEF DESCRIPTION OF THE INVENTION

The object of the present invention is to overcome this drawback. The present invention relates to improving the known and aforementioned suspension device in such a way as to make the said suspension device operate optimally especially as regards reducing the vibration generated by the rotor for all possible flight conditions of the rotary-wing aircraft provided with the said suspension device.

Thus the suspension device of the type recalled earlier and comprising the bearing pieces, the suspension system and the aforementioned resonator means is noteworthy, according to the invention, in that it additionally includes tuning means associated with at least some of the said resonator means, each of the said tuning means being capable of tuning the natural frequency of the resonator means with which it is associated.

Thus, when the flight conditions of the aircraft and/or the operating conditions of the rotor vary in such a way as to lead to modifications in the excitation frequencies of the vibration generated by the said rotor, the natural frequency of the resonator means can be matched, by means of the invention, to the said variable excitation frequencies in such a way as to optimize the operation of the said suspension device, with respect to these new conditions.

In a first particularly advantageous embodiment of the invention, each of the said tuning means includes an additional flapping mass for tuning, the movement of which is controlled by an appropriate control means, the said flapping mass for tuning being connected to the flapping mass of the resonator means with which it is associated.

Furthermore, in a second advantageous embodiment, the said flapping masses are mounted so that they can be shifted along the corresponding mass supports, respectively in the longitudinal directions of the said mass supports, and each of the said tuning means includes a drive means capable of shifting the associated flapping mass in the longitudinal direction of the corresponding mass support and of keeping it at a given position on the said mass support.

Moreover, in order to be able automatically to tune the natural frequency of the said resonator means, the suspension device in accordance with the invention is noteworthy in that it additionally includes at least one control system comprising:

at least one sensor capable of measuring the values of at least one parameter which represents a performance criterion of the said suspension device; and a computer receiving the values measured by the said sensor, and as a function of these values determining commands for the said tuning means in order to control the tuning of the natural frequency of the said resonator means, and sending the commands thus determined to the said tuning means.

The suspension device may also be equipped with monitoring and safety means to avoid the deterioration of its elements, for example in the event that one sensor might provide erroneous or excessive information.

Depending on the embodiment envisaged, the suspension device in accordance with the invention may include:

either a number of control systems, each of which is associated with one of the said tuning means;

or a single control system capable of sending commands to all the said tuning means, which makes it possible to simplify production and reduce the cost of the said suspension device.

Furthermore, when the said suspension leaves are of the type having two longitudinally adjacent leaf sections, of which the leaf section facing the fuselage is rigid and of which the leaf section facing the transmission box is flexible, the said rigid leaf section is preferably arranged so that it is inclined with respect to a plane orthogonal to the axis of the rotor and passing through the articulation articulating the said rigid leaf section to the fuselage of the aircraft. This inclination makes it possible in particular to adjust the amplification specified hereafter of the flapping mass of the corresponding resonator means.

In addition, in order to give still further adjustment of this amplification, the said mass supports are advantageously inclined with respect to a plane orthogonal to the axis of the rotor and passing through the said mass supports, it being possible for the angle of inclination thus obtained to adopt all possible values up to 90°, or even 180°.

Furthermore, to optimize the filtering of vibration at a specific overall load pattern, for a given structure having given modal characteristics, different masses for each flapping mass are advantageously envisaged.

Furthermore, in another advantageous embodiment of the invention, the said suspension leaves are made, partially or completely, from a piezoelectric material, and the said suspension device includes at least one current generator capable of generating an electric current in the piezoelectric material of the said suspension leaves, which makes it possible, depending on the strength of the electric current generated, to adjust certain physical properties of the said suspension leaves, especially their rigidity.

Moreover, and advantageously, the attachment bearings intended to fix the suspension leaves to the transmission box each include a part with a rounded head which is secured to the corresponding suspension leaf, which is offset along the axis of the rotor with respect to the plane of the said suspension leaf and the rounded head of which is mounted in a bearing support secured to the transmission box and provided with an elastomer surrounding the said rounded head. This rounded head may be spherical, cylindrical, etc.

BRIEF DESCRIPTION OF THE DRAWINGS

The figures of the appended drawing will make it easy to understand how the invention may be embodied. In these figures, identical references denote similar elements.

FIG. 1 diagrammatically and partially represents a suspension device in accordance with the invention.

DETAILED DESCRIPTION OF THE INVENTION

Figure 3:
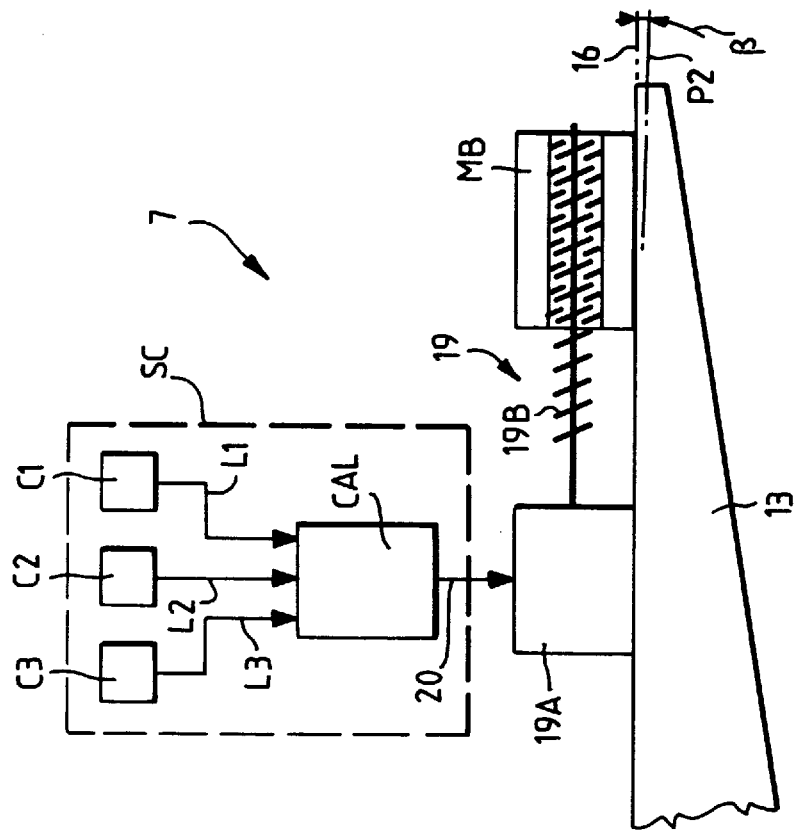
FIG. 3 diagrammatically shows a part of the suspension device in accordance with the invention, in a second embodiment.

The suspension device 1 in accordance with the invention and represented diagrammatically and partially in FIG. 1 is intended to provide the suspension of a transmission box BT of a rotary-wing aircraft, not represented, for example a helicopter. The said transmission box BT, for example the main transmission box of a helicopter, in the context of the present invention is mounted, in a known way, between propulsion means, not represented, and a lift rotor, also not represented, of the said aircraft so that it is longitudinal to the axis X—X of the said rotor. The said axis X—X, represented in chain line in FIG. 1, therefore corresponds both to the axis of the said rotor and to the axis of the said transmission box BT.

The said suspension device 1 is of the type described in patents FR-A-2,474,996 and FR-A-2,499,505 of the Applicant Company, and it comprises:

bearing pieces 2 distributed radially around the said transmission box BT, the upper ends 2A of which are connected to the upper part 3 of the transmission box BT in a known way by means, each time, of an articulation 4 especially comprising a ball 4A mounted on a rod 4B secured to the transmission box BT, and the lower ends 2B of which are articulated to suspension leaves 5, by means, each time, of an articulation 6;

a suspension system SU specified hereinbelow and connecting the lower part 9 of the transmission box BT to the fuselage F of the aircraft, represented partially and diagrammatically; and resonator means 7 associated respectively with the said bearing pieces 2.

In the example represented, the said bearing pieces 2 are made in the form of oblique bars, the respective upper continuations of which (not represented) converge substantially at a point, not represented, on the axis X—X. However, in the context of the present invention, the said bearing pieces may also be produced in the form of fittings substantially parallel to the axis X—X.

Furthermore, the said suspension system SU includes:

the said suspension leaves 5 which are distributed radially around the said transmission box BT in a plane P1 substantially orthogonal to the axis X—X of the rotor, the radially inner ends 8A of which are fixed to the lower part 9 of the said transmission box BT by means of attachment bearings 10 specified hereinbelow, and the radially outer ends 8B of which are articulated each time to a bearing F1 secured to the fuselage F by means of an articulation 11 of a known type, represented diagrammatically; and a substantially flat membrane 12 represented partially, fixed by known means, not represented, beneath the transmission box BT and projecting radially beyond the said transmission box BT, this membrane being fixed in a known and unrepresented way by its peripheral part to the fuselage F of the aircraft so that it is substantially orthogonal to the axis X—X of the rotor, it being deformable in bending when subjected to forces exerted orthogonally to its plane, and rigid when subjected to forces exerted in its plane.

Moreover, each of the said resonator means 7 includes:

a mass support 13 which is fixed, by one 13A of its ends, to the associated suspension leaf 5, close to the articulation 6 of the bearing piece 2, by means of two journals 14 and 15. The said mass support 13 on its upper face has a longitudinal direction 16 which passes through the axis X—X of the rotor; and a flapping mass MB arranged on the free end 13B of the said mass support 13.

The said resonator means 7 are essentially intended to reduce the vibration of the fuselage caused by the alternating forces of the rotor and transmitted by the bearing pieces 2, via the transmission box BT. Filtering out the forces transmitted reduces the level of vibration in the fuselage F of the aircraft.

It will be noted that the characteristics of the suspension device 1 described earlier, as it is known in the state of the art, are fixed and set to operate optimally for predetermined flight conditions.

Thus, to make the said suspension device 1 operate optimally for all flight conditions of the helicopter and all operating conditions of the rotor, that is to say to match it to varying operating conditions, the said suspension device 1 additionally includes, according to the invention, tuning means 18, 19 associated with at least some of the said resonator means 7, each of the said tuning means 18, 19 being capable of tuning the natural frequency of the resonator means 7 with which it is associated, as indicated by an arrow C in chain line in FIG. 1.

Thanks to the said tuning means 18, 19, the natural frequency of the resonator means 7 can be matched to varying excitation frequencies (of the vibration generated by the rotor), the said excitation frequencies depending especially on the flight conditions of the aircraft and/or on the operating conditions of the rotor.

Figure 2:
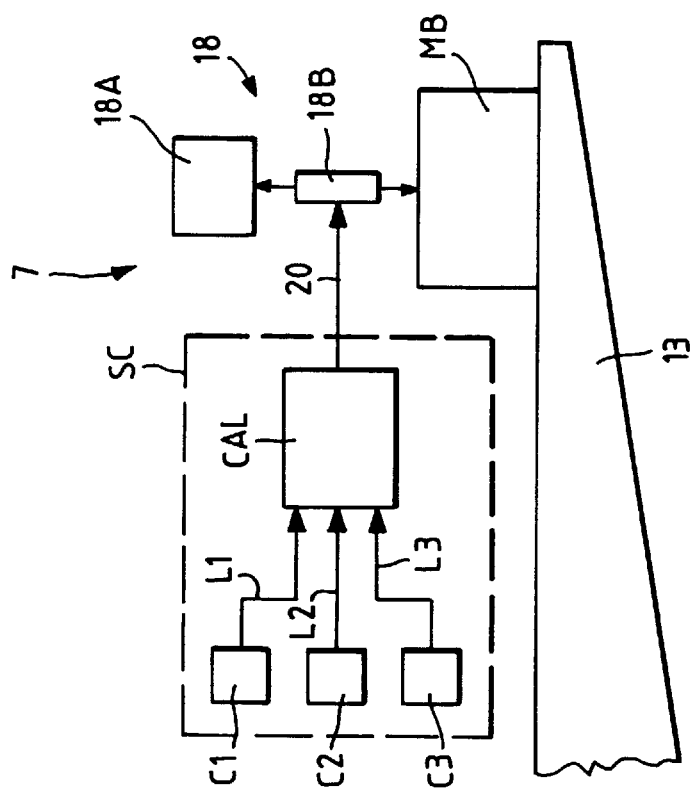
FIG. 2 diagrammatically shows part of the suspension device in accordance with the invention, in a first embodiment.

In a first embodiment represented partially and diagrammatically in FIG. 2, each of the said tuning means 18 comprises:

a flapping mass 18A for tuning connected to the said flapping mass MB which is fixed by known means, not represented, to the mass support 13; and a control means 18B, of a known type, for example an electric actuator, mounted between the said flapping mass MB and the said flapping mass 18A for tuning in order to control the movement of the said flapping mass 18A for tuning.

Thus, by controlling the movement of the flapping mass 18A for tuning, it is possible to tune the natural frequency of the resonator means 7 thus automatically controlled.

Furthermore, in order to be able automatically to tune the said natural frequency, the suspension device 1 in accordance with the invention additionally includes at least one control system SC connected by a link 20 to the said control means 18B and comprising:

sensors C1 to C3 capable of measuring the values of at least one parameter which represents a performance criterion of the said suspension device 1; and a computer CAL receiving the values measured by the said sensors C1 to C3 via links L1 to L3 which may process the measurements (carry out filtration, harmonic analysis, etc.), and determine, in real time, as a function of the values received, commands for the said control means 18B so as to control the movement of the said flapping mass 18A for tuning, and send the commands thus determined to the said control means 18B.

Depending on the anticipated operating method, the said sensors C1 to C3 are intended:

either to measure accelerations, stresses or forces at various points, not represented, on the fuselage or specific members of the aircraft;

or to transmit the values of parameters available on the aircraft, such as the speed, the engine speed or the altitude of the said aircraft.

From the data thus received, the said computer CAL determines, using a more or less complex algorithm, commands making it possible to maximise the performance criterion used.

Depending on the flight configuration, the algorithm provides positional control of each flapping mass 18A for tuning so as to minimise the overall level of vibration. After each shift of each flapping mass for tuning, the algorithm analyses the variation in the overall level of vibration and correspondingly adapts the direction of shift of the flapping mass for tuning. The automatic control of the positions of the flapping masses is stopped when the overall level of vibration has reached a reference value.

What is more, in a second embodiment represented in FIG. 3, the flapping mass MB is mounted so that it can be shifted along the mass support 13 in the longitudinal direction 16 thereof and the tuning means 19 includes a drive means 19A, for example a motor with a worm 19B or any other known drive means capable, on the one hand, of shifting the said flapping mass MB in the direction 16 and, on the other hand, of keeping it in a given position for which the natural frequency of the said resonator means 7 is matched to the frequency of the vibration to be reduced of the bearing piece 2, which vibration is generated by the rotation of the rotor.

In this second embodiment, a control system SC identical to the aforementioned control system SC of FIG. 2 may also be associated with the said tuning means 19 in order automatically to tune the said natural frequency.

In order to carry out this automatic tuning of the natural frequency, the suspension device 1 in accordance with the invention includes:

either a single control system SC capable of sending commands, generally different, to all the tuning means 18 or 19 of the suspension device 1, by means of a link 20 which is then scaled down and connected to all the elements 18B or 19A;

or a number of control systems SC, each of which is associated with just one of the said tuning means 18 or 19 of the suspension device 1.

It will be noted that in the context of the present invention the suspension device 1 may include:

in a first embodiment, only one single type of tuning means, that is to say either tuning means in accordance with the said tuning means 18 of FIG. 2, or tuning means in accordance with the said tuning means 19 of FIG. 3; and in a second embodiment, tuning means of each of the two said types 18 and 19 simultaneously.

Furthermore, as may be seen in FIG. 1, each of the suspension leaves 5, has, in the known way, longitudinally adjacent leaf sections 21, 22, of which the leaf section 21 facing the fuselage F is rigid and of which the leaf section 22 facing the transmission box BT is flexible.

According to the invention, the longitudinal direction 23 of the said rigid leaf section 21 is inclined by an angle α with respect to the said plane P1 orthogonal to the axis X—X of the rotor.

This inclination makes it possible to tune the amplification of the movement of the flapping mass MB to a value which is as high as possible, while respecting the integration (bulk) and production (minimum distance between the articulations 6 and 11) constraints.

In surge ("vertical" degree of freedom, i.e. freedom along the axis X—X), the amplification σ of the movement of the flapping mass MB is defined using the following expression:

$$\sigma = \frac{\text{"vertical" travel of the resonator means 7}}{\text{"vertical" travel of the transmission box } BT}$$

the fuselage F being assumed to be stationary.

For the other degrees of freedom, the amplification is extrapolated from the previous one by replacing the "vertical" travel of the transmission box BT with the degree of freedom under consideration.

The inclination of the rigid leaf section 21 makes it possible to place this amplification σ at an optimum value (high enough to be competitive in terms of mass, but not so high that it results in a suspension which is too "pointy" and difficult to tune) while respecting the constraints of integration and of technology inherent to the aircraft on which the suspension device 1 is to be mounted.

Furthermore, in a special embodiment, the mass support 13 is fixed to the suspension leaf 5 in such a way as to have a longitudinal direction 16 which makes an angle β with respect to a plane P2 orthogonal to the axis X—X of the rotor and passing through the said mass support 13.

In practice, this angle β which, according to the invention, may have any value from 0° to 90°, is chosen in such a way as to optimize the amplification of the movement of the flapping mass MB.

In addition, according to the invention, the attachment bearings 10 allowing the suspension leaves 5 to be fixed to the transmission box BT each include a part 24 with a spherical head 25:

which is fixed to the corresponding suspension leaf 5 by an appropriate attachment means 26, for example using a screw;

which may be offset along the axis X—X of the rotor with respect to the plane P1 of the suspension leaf 5;

and the spherical head 25 of which is mounted in a bearing support 27 secured to the transmission box BT and provided with an elastomer 28 surrounding the said spherical head 25.

This offset along the axis X—X especially makes it possible to reduce the tension in the elastomer 28 as the suspension leaf 5 bends.

The suspension device 1 in accordance with the invention has yet more advantageous features specified hereinbelow, particularly as regards the materials used.

On the one hand, the membrane 12 is preferably made of fibreglass, carbon fibre or a material composed of glass and of carbon.

On the other hand, the suspension leaves 5 are made, partially or completely, preferably from a piezoelectric material. In this case, the suspension device 1 additionally includes at least one current generator 29 capable of generating an electric current in the said piezoelectric material, by means of an electric link 30.

Thus, by varying the strength of the said electric current in the suspension leaf 5, it is possible to alter some of its physical properties, especially its rigidity.

In this case, it is also possible to provide either a single current generator 29 for all the suspension leaves 5 of the suspension device 1, or one current generator 29 per suspension leaf 5.

In addition, the device according to the invention may be associated with a surveillance system for monitoring the critical elements of the suspension and of the installation, it also being possible for a certain number of the surveillance functions to be carried out by the computer CAL.

We claim:

1. Suspension device for a transmission box (BT) of a rotary-wing aircraft, the said transmission box (BT) being mounted between propulsion means and a lift rotor of the said aircraft such that it is substantially longitudinal to the axis (X—X) of the said rotor and being suspended with respect to the fuselage (F) of the said aircraft, the said suspension device (1) including:

bearing pieces (2) distributed radially around the said transmission box (BT), the upper ends (2A) of which are connected to the upper part (3) of the transmission box (BT) and the lower ends (2B) of which are articulated to suspension leaves (5);

a suspension system (SU) connecting the lower part (9) of the transmission box (BT) to the fuselage (F) of the aircraft and especially including the said suspension leaves (5) which are distributed radially about the said transmission box (BT) in a plane (P1) substantially orthogonal to the axis (X—X) of the rotor, the radially inner ends (8A) of which are fixed to the lower part (9) of the said transmission box (BT), and the radially outer ends (8B) of which are articulated to the fuselage (F); and resonator means (7) associated respectively with the said bearing pieces (2), each of the said resonator means (7) including a mass support (13) which is secured by one of its ends (13A) to the suspension leaf (5) connected to the associated bearing piece (2), which has a longitudinal direction (16) passing through the axis (X—X) of the rotor, and which is equipped at its other end (13B) with a flapping mass (MB), characterized in that it additionally includes tuning means (18, 19) associated with at least some of the said resonator means (7), each of the said tuning means (18, 19) being capable of tuning the natural frequency of the resonator means (7) with which it is associated, some of the said tuning means (18) including an additional flapping mass (18A) for tuning, the movement of which is controlled by an appropriate control means (18B), the said flapping mass (18A) for tuning being connected to the flapping mass (MB) of the resonator means (7) with which it is associated.

2. Suspension device according to claim 1, characterized in that some of the said flapping masses (MB) are mounted so that they can be shifted along the corresponding mass supports (13), respectively in the longitudinal directions (16) of the said mass supports (13), and in that each of the tuning means (19) associated with the said shiftable flapping masses (MB) includes a drive means (19A, 19B) capable of shifting the associated flapping mass (MB) in the said longitudinal direction (16) of the corresponding mass support (13) and of keeping it at a given position on the said mass support (13).

3. Suspension device according to claim 1, characterized in that it additionally includes at least one control system (SC) comprising:

at least one sensor (C1 to C3) capable of measuring the values of at least one parameter which represents a performance criterion of the said suspension device; and a computer (CAL) receiving the values measured by the said sensor (C1 to C3), and as a function of these values determining commands for the said tuning means (18, 19) in order to control the tuning of the natural frequency of the said resonator means (7), and sending the commands thus determined to the said tuning means (18, 19).

4. Suspension device according to claim 3, characterized in that it includes a number of control systems (SC), each of which is associated with one of the said tuning means (18, 19).

5. Suspension device according to claim 3, characterized in that it includes a single control system (SC) capable of sending commands to all the said tuning means (18, 19).

6. Suspension device according to claim 1; the said suspension leaves (5) having two longitudinally adjacent leaf sections (21, 22), of which the leaf section (21) facing the fuselage (F) is rigid and of which the leaf section (22) facing the transmission box (BT) is flexible, characterized in that the said rigid leaf section (21) is inclined with respect to a plane (P1) orthogonal to the axis (X—X) of the rotor and passing through the articulation (11) articulating the said rigid leaf section (21) to the fuselage (F) of the aircraft.

7. Suspension device according to claim 1, characterized in that the said flapping masses (MB) have different masses.

8. Suspension device according to claim 1, characterized in that the said mass supports (13) are inclined with respect to a plane (P2) orthogonal to the axis (X—X) of the rotor and passing through the said mass supports (13).

9. Suspension device according to claim 1, characterized in that the said mass supports (13) are substantially parallel to the axis (X—X) of the rotor.

10. Suspension device according to claim 1, characterized in that the said suspension leaves (5) are made at least partially from a piezoelectric material, and in that the said suspension device (1) includes at least one current generator (29) capable of generating an electric current in the piezoelectric material of the said suspension leaves (5).

11. Suspension device according to claim 1, the said suspension leaves (5) being fixed to the said transmission box (BT) by means of attachment bearings (10), characterized in that the said attachment bearings (10) include a part (24) with a rounded head (25) which is secured to the corresponding suspension leaf (5), which is offset along the axis (X—X) of the rotor with respect to the plane (P1) of the said suspension leaf (5) and the rounded head (25) of which is mounted in a bearing support (27) secured to the transmission box (BT) and provided with an elastomer (28) surrounding the said rounded head (25).

12. Suspension device according to claim 1, the said suspension system (SU) additionally including a substantially flat membrane (12) arranged beneath the transmission box (BT), projecting radially beyond the said transmission box (BT), this membrane being fixed by its peripheral part to the fuselage (F) of the aircraft so that it is orthogonal to the axis (X—X) of the rotor, it being deformable in bending when subjected to forces exerted orthogonally to its plane, and rigid when subjected to forces exerted in its plane, characterized in that the said membrane (12) is made of fibreglass.

13. Suspension device according to claim 1, the said suspension system (SU) additionally including a substantially flat membrane (12) arranged beneath the transmission box (BT), projecting radially beyond the said transmission box (BT), this membrane being fixed by its peripheral part to the fuselage (F) of the aircraft so that it is orthogonal to the axis (X—X) of the rotor, it being deformable in bending when subjected to forces exerted orthogonally to its plane, and rigid when subjected to forces exerted in its plane, characterized in that the said membrane (12) is made of carbon fibre.

14. Suspension device according to claim 1, the said suspension system (SU) additionally including a substantially flat membrane (12) arranged beneath the transmission box (BT), projecting radially beyond the said transmission box (BT), this membrane being fixed by its peripheral part to the fuselage (F) of the aircraft so that it is orthogonal to the axis (X—X) of the rotor, it being deformable in bending when subjected to forces exerted orthogonally to its plane, and rigid when subjected to forces exerted in its plane, characterized in that the said membrane (12) is made of a material composed of glass and of carbon.

* * * * *